UNITED STATES PATENT OFFICE.

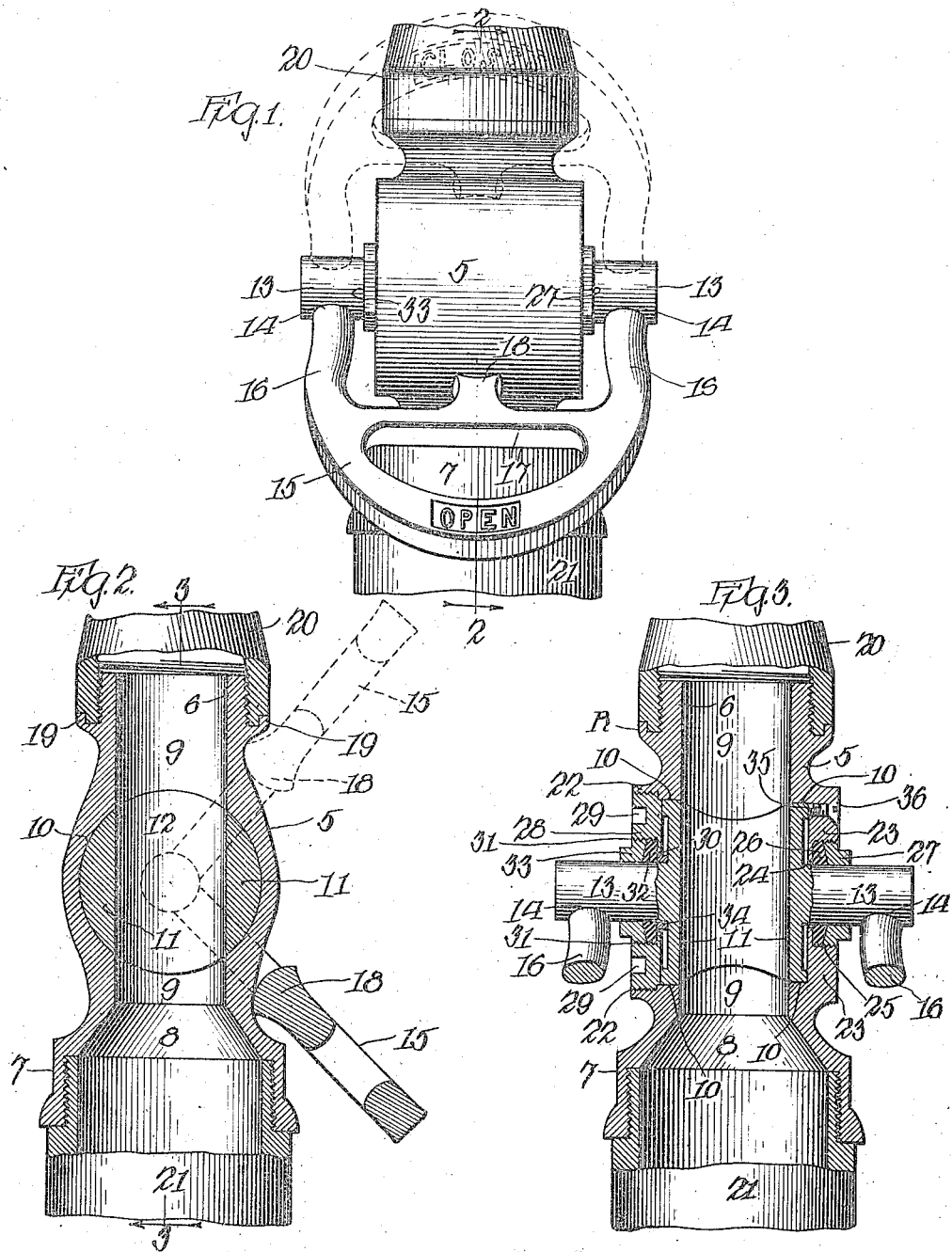

ALFRED ANDERSON, OF CHICAGO, ILLINOIS.

ADJUSTABLE AND TAPER-GROUND VALVE OR PLUG FOR FIRE-HOSE.

1,248,781.

Specification of Letters Patent.

Patented Dec. 4, 1917.

Application filed November 11, 1916. Serial No. 130,687.

*To all whom it may concern:*

Be it known that I, ALFRED ANDERSON, a citizen of the United States, and a resident of Chicago, in the county of Cook and State of Illinois, have invented certain new and useful Improvements in an Adjustable and Taper-Ground Valve or Plug for Fire-Hose, of which the following is a specification.

This invention relates to improvements in a control-valve or plug, which is more particularly intended for use in connection with fire hose, but which may be employed for other purposes, and it consists in certain peculiarities of the construction, novel arrangement and operation of the various parts thereof as will be hereinafter more fully set forth and specifically claimed.

The principal object of the invention is to provide a valve or plug of the above-named general character, which shall be simple and inexpensive in construction, strong, durable and efficient in operation, with its parts so made as to afford novel means for preventing leakage of liquid therefrom when the parts become worn from usage. A further object of the improvement is to adapt the valve or plug for easier and more convenient manipulation in turning on or shutting off the water, and so that it may be seen at a glance whether or not the valve is open or closed.

Other objects and advantages of the invention will be disclosed in the sub-joined description and explanation.

In the accompanying drawing which serves to illustrate an embodiment of the invention, Figure 1, is a view in elevation of a fragment of the nozzle of a fire-hose and a portion of the end coupling of the hose, showing my improved valve uniting said nozzle and coupling and illustrating by dotted lines the position to which the handle which turns the valve or plug may be placed when the valve is closed and by continuous lines the position the handle will occupy when the valve is open.

Fig. 2, is a central longitudinal sectional view taken on line 2—2 of Fig. 1, looking in the direction indicated by the arrows, and Fig. 3, is a similar view, taken on line 3—3 of Fig. 2, looking in the direction indicated by the arrows.

Like numerals of reference refer to corresponding parts throughout the different views of the drawing.

The casing or housing of the valve or plug is designated by the reference numeral 5, and is by preference of the shape shown in the drawing, that is to say, its central portion is substantially cylindrical in shape when viewed from the side, but has oppositely disposed extensions 6 and 7, the former of which is externally screw-threaded while the latter is internally screw-threaded and has at the inner portion of its screw-threads a flared opening 8 which communicates with the port or passage way 9 which extends longitudinally through the valve casing. The central or substantially cylindrical portion of the casing 5, is provided with a cylindrical opening or bore 10, which is by preference slightly tapered from one of its ends toward its other end. This bore or opening 10 is for the reception and operation of the valve or plug 11 which is circular in cross-section and is provided with a transverse opening 12 to register with the port or passage 9, and said opening in the valve or plug 11 is by preference of the same size as the port 9, as is clearly shown in Figs. 1 and 2 of the drawing. The valve 11 has centrally located at each of its ends a stud shaft 13, each of which is provided with a transverse opening 14 to receive the ends of a handle 15, which is substantially horse-shoe shaped as shown, so that its prongs 16 will stride the valve casing. The handle 15 is provided near its outer or free portion with a transversely extended bar 17 which has on its middle portion adjacent to the casing 5 an enlargement 18 to rest against the casing 5 when the valve is opened or closed. This handle has displayed on one of its surfaces at its free end, the word "Open" and on the opposite surface at a corresponding position the word "Closed", to indicate at a glance the position of the opening 12 in the valve. The front or upper end of the casing 5 is provided with an annular flange 19 on its outer surface at the lower portion of the screw-threads on said extension against which the end of the nozzle 20, when screwed on to the extension 6 of the casing will rest. The hose coupling 21 which may be of the ordinary or any preferred kind is screwed into the screw-threaded portion of the extension 7 of the valve casing as will be readily understood by reference to the drawing.

Referring now to Fig. 3 of the drawing, it will be seen that the casing 5 is provided at one of its sides with a screw-threaded opening 22 which is concentric with the end of the bore or opening 10 adjacent thereto, but is somewhat larger than said bore. It will also be observed by reference to said figure that the bore or opening 10 does not extend through the casing 5 at the opposite side thereof from the screw-threaded opening 22, but terminates in the wall 23 of the casing. This wall or portion 23 of the casing has an opening 24 which is concentric with the end of the bore 10 adjacent to the wall 23 and is for the reception of one of the shafts 13 of the valve. Extended inwardly from the outer surface of the wall or portion 23 of the valve casing, and around the opening 24 is a screw-threaded recess 25 in which is located packing 26 of any desired or suitable kind which is by preference pressed into the recess 25 and which surrounds the shaft 13 as shown. Surrounding the shaft 13 and in screw engagement with the recess 25 is a nut or gland 27 which serves to assist in holding the packing 26 in position so as to prevent leakage. Screwed into the opening 22 of the valve casing is a disk or ring 28 which may be provided with openings 29 for a spanner wrench to be used in turning said ring or disk. This member is provided with a central opening 30 and on its outer surface with a screw-threaded recess 31 in which is located suitable packing 32 which surrounds the shaft 13 of the valve adjacent to the member 28, and like the packing 26 is thickened inwardly and held in the member 28 by pressure. Screw-threaded into the recess 31 is a nut or gland 33 which surrounds the shaft 13 and serves to assist in holding the packing 32 in position so as to prevent leakage. Surrounding the shaft 13 adjacent to the member 28 and interposed between the packing 32 and the end of the valve 11 adjacent said packing is a washer or ring 34 which is by preference of metal such as brass. Located in the wall or portion 23 of the valve casing is a screw 35 the inner end of which is adapted to contact with the end of the valve or plug 11 adjacent thereto, so that by turning the screw 35 in the proper direction the valve or plug 11 may be adjusted laterally. The screw 35 is concealed and protected by another screw 36 seated in the wall or portion 23 of the valve casing in alinement with the first named screw.

Having thus fully described my invention, what I claim as new and desire to secure by Letters Patent is—

In a device of the character described, the combination with a casing having a passage way extended longitudinally therethrough and provided with a transverse bore or opening intersecting said passage, of an apertured valve or plug rotatably mounted in said bore having a stud-shaft extended from each of its ends and journaled in the casing, means on said shaft to turn the plug or valve, means on said turning means to indicate whether the valve is open or closed, a screw-threaded disk or member adjustably screwed in one end of said bore around one of said shafts and provided with a centrally located recess, packing in said recess around said shaft, a nut engaging the said recess and packing, a ring or washer interposed between the packing and adjacent end of the valve or plug, the opposite side of the casing having an opening outwardly of the valve shaft therein and a recess surrounding the shaft on that side of the plug or valve, packing in said recess around said shaft, a nut engaging said recess and packing, and a screw seated in said outwardly disposed opening in the last named side of the casing and adapted to contact at its inner end with the end of the plug of valve adjacent thereto near the periphery of said valve.

ALFRED ANDERSON.

Witnesses:
CHAS. C. TILLMAN,
L. C. PUZICK.

Copies of this patent may be obtained for five cents each, by addressing the "Commissioner of Patents, Washington, D. C."